June 3, 1930.  W. R. GRISWOLD  1,761,474

INTERNAL COMBUSTION ENGINE

Filed Feb. 13, 1928

Inventor
WALTER R. GRISWOLD.
By *Milton Tibbetts*
Attorney

Patented June 3, 1930

1,761,474

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed February 13, 1928. Serial No. 253,845.

This invention relates to internal combustion engines and more particularly to vibration damping means for the crank shafts of such engines.

It has been hertofore proposed to damp some of the vibrations which occur in the shafts of internal combustion and other engines, such as torsional vibration, by devices which absorb energy from the vibrating system at a rate sufficient to prevent the resonant growth of such vibration, and dampers of this type are well known in the art. In certain types of engines however, considerable roughness in operation is traceable to transverse deflection or bending of the crank shaft under the loads caused by the gas pressures on the pistons. This phenomenon is particularly marked in engines of the type in which there is more than one crank between adjacent shaft bearings, but it obtains to some extent in all multi-cylinder engines. At certain speeds of the engine these bending loads may occur at a frequency which is in synchronism with the natural frequency of the shaft, and a period of resonance occurs from which a very disturbing vibration may be built up.

One of the objects of the present invention is to provide an engine having means for damping transverse or bending vibration in the crank shaft thereof.

Another object of the invention is to provide such damping means which will not increase the dimensions of the engine, or necessitate additional space for the engine in which it is to be incorporated.

A further object of the invention is to provide a simple and effective damping device of the character designated which shall be carried by and completely enclosed within one of the crank arms of the engine shaft.

Other objects of the invention will appear from the following description taken in connection with the drawings, which form a part of this specification, and in which.

Figure 1:
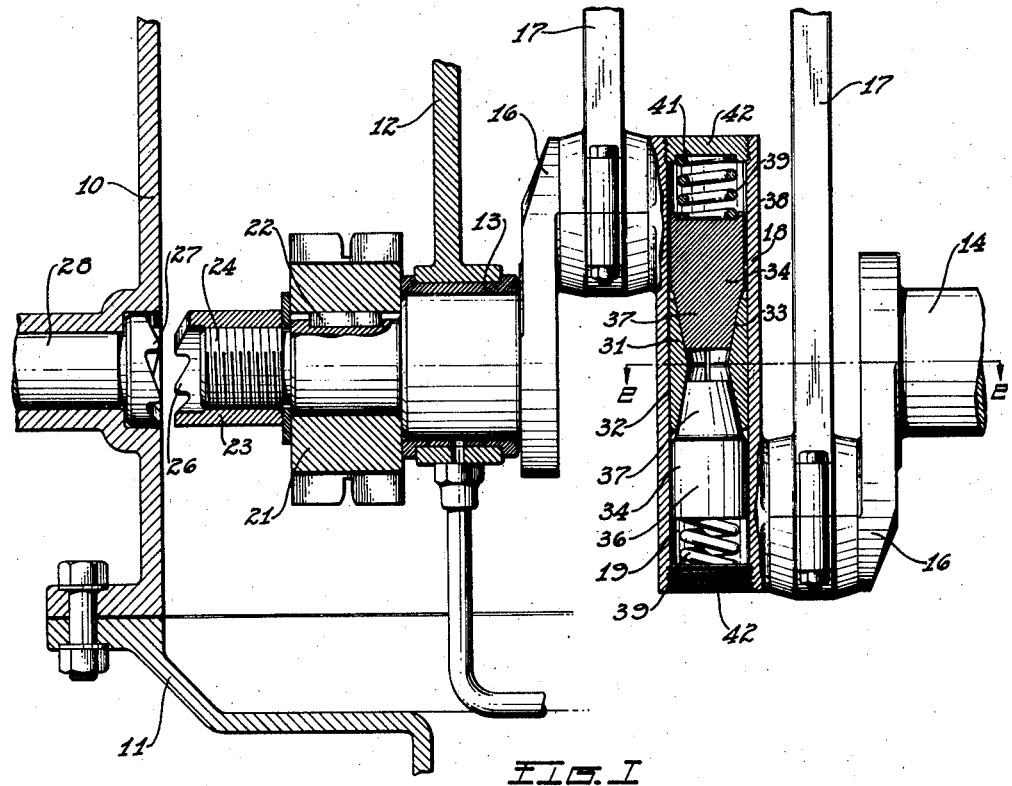
Fig. 1 is a view partially in section and partially in side elevation of a portion of an internal combustion engine embodying the invention.
Figure 2:
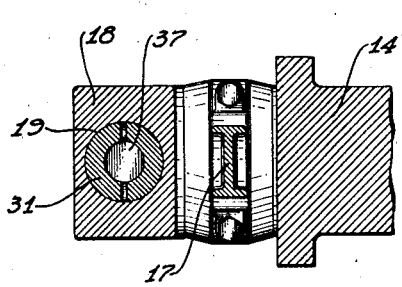
Fig. 2 is a transverse section substantially on the line 2—2 of Fig. 1.
Figure 3:
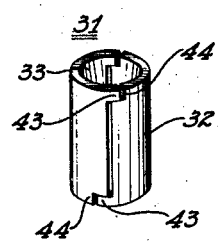
Fig. 3 is a view in perspective of the friction member of the device.

Referring to the drawing, 10 represents the crank case of an internal combustion engine having a removable lower cover or oil pan 11 and provided with transverse webs, such as 12. These webs support suitable aligned bearings 13 for an engine crank shaft 14, the latter having the usual integral cranks 16, each of which is connected by a connecting rod 17 with a piston mounted in one of the engine cylinders, the piston and cylinder not being shown in the drawing, but being of usual construction. In the embodiment of the invention shown, the crank shaft 14 is of that type in which the cranks 16 are formed in pairs between adjacent bearings 13, each pair having a common crank arm or cheek 18, but it is to be understood that the invention is not limited to shafts of this type but may be applied to crank shafts having any of the well known arrangements of cranks and bearings. The common crank arm 18 of each pair of adjacent cranks 16 is made hollow, preferably by drilling, from end to end, forming a cylindrical bore 19 which greatly reduces both the weight and the inertia of the shaft without materially affecting its stiffness or its strength.

The forward end of the crank shaft 14 may be provided with a gear or sprocket 21, rotatably secured thereto as by a key 22, through which the engine camshaft and other engine accessories may be driven by an intermeshing gear or a sprocket chain (not shown). The gear 21 may be conveniently retained in axial position by a nut 23 screwed to the reduced end 24 of the shaft and provided with teeth 26, which may be engaged with teeth 27 on an endwise movable starter shaft 28. This is the usual hand starting crank for manually rotating the crank shaft for starting.

The damping means of this invention is illustrated as mounted near the forward end of the crank shaft 14 in a suitable guide and retaining part thereof, which is preferably the bore 19. It is in the form of a friction member 31 slidably mounted within the cylindrical bore 19, and expansible therein to frictionally engage the wall of said bore. It has an outer cylindrical surface 32 to cooperate with the wall of the bore 19, and it has also a conical or tapered inner surface 33, sloping from a maximum diameter at each end of the member 31 to a minimum diameter at the center thereof. This friction member 31 is also split longitudinally, or it may be formed in two parts, so that it may be increased in diameter or expanded to vary the frictional pressure between its outer surface 32 and the cylindrical bore 19.

Cooperating with the friction member 31 are inertia members 34, slidably mounted in the bore 19 on either side of the friction member. Each of these inertia members has a cylindrical portion 36 adapted to slidably engage the wall of the bore, and a conical or tapered portion 37 adapted to engage the conical inner surface 33 at one end of the friction member 31. Expansion of the friction member into frictional engagement with the wall of the bore 19 is thus provided by the wedging action between the surfaces 37 and 33, upon relative axial movement between the friction member and the inertia members 34.

The cylindrical end of each of these inertia members 34 is formed with a recess 38, providing a seat or abutment for a coil spring 39, the other end of which is seated in an abutment 41 on the crank arm 18. These abutments 41 are conveniently provided by plugs 42, threaded or otherwise suitably secured to the crank arm to close the ends of the bore 19 therein. The springs 39 act in opposite directions, each tending to urge its associated inertia member toward the center of the bore 19, so that any motion of the slidable parts takes place against the pressure of one or the other of these springs. The springs 39 are initially compressed, so that they serve to urge the friction member and the associated inertia members toward their neutral position at the center of the bore and to return them to said neutral position after any displacement therefrom.

Each portion of the friction member 31 may be provided with an ear 43, formed at the margin thereof and adapted to seat in a notch 44 formed in the cooperating part of the friction member, thus preventing any relative axial displacement of the friction member sections.

The operation of the device will be easily understood from the foregoing description. The springs 39 are so adjusted as to bring the center of gravity of the friction member 31 on the axis of rotation of the crank shaft, and as the inertia members 34 are of equal mass and symmetrically disposed with respect to the friction member 31, the center of gravity of the combination of slidable members normally remains on this axis. These members are thus unaffected by normal rotation of the shaft, except that the equal and opposite centrifugal forces tend to withdraw them slightly from contact with the friction member 31 against the compression of their respective springs 39. Upon the inception of a transverse vibration, however, the inertia members are subjected to an alternating force acting transversely of the shaft in the midplane of the arm 18 which force tends to slide the inertia members, and with them the friction members 31, longitudinally of the bore 19. Such sliding motion is resisted by the action of the springs 39, and also by the friction of the slidable parts. Because of such frictional resistance to movement of the member 31, the inertia of the members 34 tends to force them into wedging engagement with the tapered portion 33 of this friction member, thus expanding the friction member in the bore 19 and further increasing the frictional resistance to sliding of this member.

The energy thus dissipated in friction between the member 31 and the bore 19, is subtracted from the energy of the vibration, the resonant growth of which is thus prevented, and the vibration is effectually damped.

It will be evident that this invention provides a simple and effective damper for the transverse vibration of a crank shaft, which is completely enclosed and does not increase the engine dimensions in any way. The device is easy to install and adjust, the tension of the springs 39 being regulated by the abutments in the threaded plugs 42, and no lubrication or other attention is required. It will be further apparent that this device does not in any way interfere with the installation of a damper for the torsional vibration in the shaft.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with an internal combustion engine having a crank shaft with a hollow crank arm, of an expansible friction member slidably mounted in said arm, and inertia means responsive to shaft vibration to expand said friction member to increase the friction thereof.

2. The combination with an internal combustion engine having a crank shaft with a hollow crank arm, of an expansible member slidably mounted in said arm in frictional engagement therewith, an inertia member slidable in said arm in response to the vibration thereof, and adapted to expand such friction member, and spring means urging the inertia member into engagement with the friction member.

3. The combination with an internal combustion engine having a crank shaft with a hollow crank arm, of a member slidably mounted in said arm and in frictional engagement therewith, inertia means in said arm to increase the friction upon movement of said member therein, and springs urging said means toward its neutral position.

4. The combination with an engine including a crank shaft having an arm provided with a hollow bore, of damping means for said shaft including an expansible friction member slidably mounted in said bore and having a conical opening, an inertia member in said bore having a conical portion engaging in said conical opening to expand the member, and a spring urging the inertia member toward the friction member.

5. The combination with an internal combustion engine having a crank shaft with a hollow crank arm, of a member slidably mounted in said arm and in frictional engagement therewith, and inertia means in said arm to increase the friction upon movement of said member in said arm.

6. A vibration damper for crank shafts, comprising a crank arm having a longitudinal bore, a damping member slidably mounted in said bore and frictionally engaging the walls thereof, and means operable with said damping member to increase the friction upon a transverse vibration of said crank shaft.

7. A vibration damper for crank shafts, comprising a hollow crank arm defining a cylindrical guide, inertia members adapted to oscillate in said guide in response to transverse shaft vibrations, and expansible means frictionally engaging said guide and actuated by the inertia members to damp said transverse vibrations.

8. A vibration damper for crank shafts, comprising an inertia member adapted to oscillate transversely of the shaft in response to shaft vibration, and frictional means including an expansible wedge member operable by said inertia member to dissipate the energy of said vibration.

9. A vibration damper for crank shafts, comprising a member slidable on an arm of said crank shaft and frictionally engaging said arm, and inertia means responsive to transverse shaft vibration and adapted to operate said friction member to damp said vibration.

10. A vibration damper for crank shafts, comprising a crank arm having a longitudinal bore, a two-part friction member slidably mounted in said bore and expansible to frictionally engage the walls thereof, inertia members slidable in the bore to exert a wedging action between the parts of the friction member, and springs urging said inertia members toward the friction member.

11. The combination with an internal combustion engine having a crank shaft with a crank arm, of a member slidably supported by said arm and in frictional engagement therewith, and inertia means on the arm operable to increase the friction upon movement of said member on the arm.

12. A vibration damper for crank shafts, comprising a crank arm having a longitudinally disposed bearing portion, a damping member slidably mounted on said bearing portion, and inertia members slidable with said damping member and operable to increase the friction thereof upon a transverse vibration of said crank shaft.

13. A vibration damper for crank shafts, comprising transversely slidable friction means on said crank shaft, and inertia members movable in response to shaft vibration and adapted to operate said friction means to damp said vibration.

14. The combination with an engine including a crank shaft having an arm, of a slidable friction member on said arm, and inertia means operable on said member to increase the friction upon movement with respect to the shaft.

15. A vibration damper for shafts, comprising a friction member transversely slidable thereon, an inertia member responsive to shaft vibration and adapted to increase said friction upon movement of said members relative to the shaft, and means to return said members to their initial position after displacement therefrom.

16. A vibration damper for a crank shaft having a crank arm, comprising friction means slidably carried by said arm, and an inertia member movable in response to shaft vibration to operate said friction means to damp the vibration.

17. A vibration damper for a crank shaft having a crank arm, comprising means slidably carried by said crank arm in frictional engagement therewith, and an inertia member movable on said crank arm in response to shaft vibrations to operate said friction means.

18. A vibration damper for a crank shaft having a crank arm, comprising friction means carried by said arm adapted to damp vibration, and an inertia device mounted on said arm and movable in response to transverse vibrations of the crank shaft adapted to operate said friction means.

In testimony whereof I affix my signature.

WALTER R. GRISWOLD.